Figure 1:
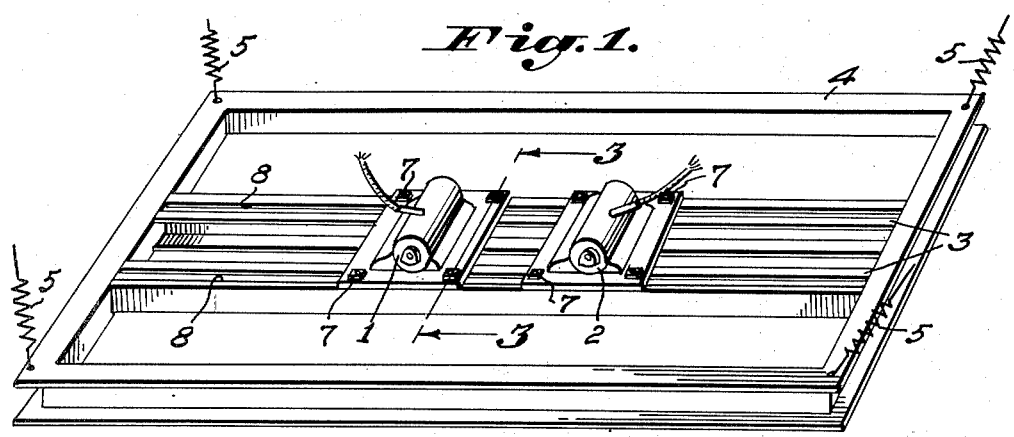

Nov. 28, 1950  R. A. O. SIGNEUL  2,531,706
VIBRATING DEVICE FOR A DIRECTED VIBRATORY EFFECT BY
MEANS OF ROTATABLE VIBRATORY MEMBERS
Filed May 25, 1948

Inventor
R. A. O. Signeul
By Henry C. Parker
Attorney

UNITED STATES PATENT OFFICE 2,531,706

VIBRATING DEVICE FOR A DIRECTED VIBRATORY EFFECT BY MEANS OF ROTATABLE VIBRATORY MEMBERS

Ragnar Alrik Olof Signeul, Saltsjo-Duvnas, Sweden, assignor to Vibro-Plus Corporation, Woodside, N. Y., a corporation of Delaware Application May 25, 1948, Serial No. 29,056
In Sweden August 6, 1946

4 Claims. (Cl. 74—61)

The present invention relates to vibrating devices for providing so-called directed vibrations by means of rotatable vibratory members the movements of which are synchronized without using toothed wheels or other mechanically operated clutches between the rotors.

Modern vibratory technique requires in an ever-increasing degree so-called directed vibrations, i. e. vibrations which, substantially act in one direction, e. g. vertically or horizontally. On vibration tables for vibrating moulds or for packing casks and boxes with fine-grained material, etc., use has hitherto been made of a simple rotor vibrator, i. e. preferably an electro-motor provided with eccentrics and mounted beneath the table as a vibrating element. With devices of this kind so-called rotary vibrations are obtained, the impulsive force changing its direction all the time. In many cases, however, greater efficiency is obtained by aid of directed vibrations. For producing these use has hitherto been made of two rotary shafts provided with eccentrics and interconnected by means of toothed wheels, so that they rotate against each other. Use has also been made of two rotor vibrators likewise interconnected by means of toothed wheels for obtaining synchronous running, so that the eccentrics cooperate in two principal directions opposite to each other, while they counteract each other in all other positions during rotation, thus resulting in the desired "directed" vibratory action. The difficulties inherent in the last-named system consist in making the attachment of the toothed wheels and the rotors sufficiently sturdy for standing the heavy strains accompanying this construction.

According to the present invention these difficulties are eliminated by avoiding the mechanically operated synchronism by means of toothed wheels or similar members. Instead, the invention is characterized by the fact that two or more individually and independently operated rotor vibrators are carried by a relatively stiff common base or frame, which base is resiliently suspended so it can oscillate in synchronism with the vibrations generated by the rotors. It has, in fact, been found that the oscillations generated in the base under these circumstances compel the rotors to oscillate with it, so that they synchronize with each other. In other words: The rotors, constituting together with the base a harmonically oscillating system, are induced to act on each other mutually, so that their motions are synchronized. If the base oscillates with bellies and nodal points, one rotor being mounted in a belly and the other at a nodal point, synchronism will be less good than when both are each mounted in a belly. If one rotor is mounted on a positive belly and the other in a negative belly, the motion of the one is phase-displaced 180° relatively to the other. Any difficulty in mounting the rotors in the most efficient manner, i. e. placing them at the right point for obtaining maximum resonance, is not generally encountered, because they impart themselves such oscillations to the base that they arrive at correct bellies, if they are mounted symmetrically on the base. If desired, the rotors may be adjustably mounted on the base, e. g. on guide rails or the like, thus facilitating adjustments to suitable positions.

Figure 2:
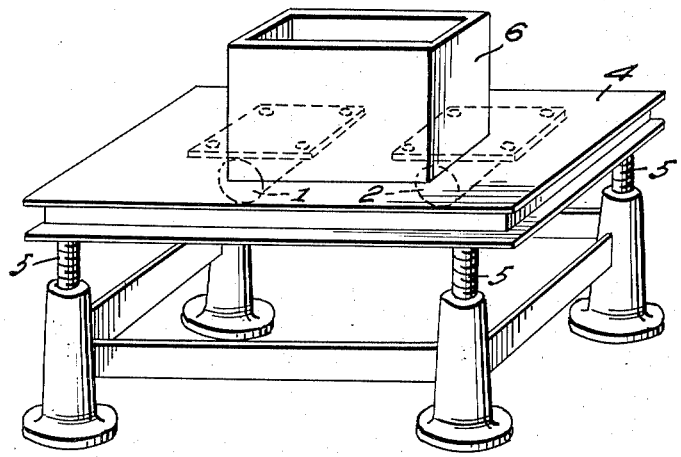

The invention is explained in the accompanying drawing showing diagrammatically a couple of illustrative devices according to the inventive idea, it being understood that the device may be varied by the expert in several ways without departing from the province of this principle. In the drawing Fig. 1 is a perspective view of two rotor vibrators mounted on a common, resiliently suspended base. Fig. 2 shows in a similar manner an agitating table carried by springs, on the underside of which two rotor vibrators are arranged according to the principle shown in Fig. 1.

Figure 3:
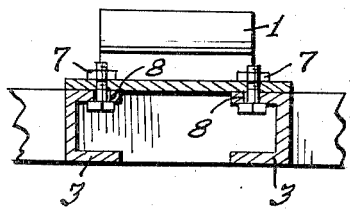

Fig. 3 is a partial vertical section taken along the line 3—3 of Fig. 1 and showing adjustment means for the rotor vibrators.

In the device shown in Fig. 1 two electric rotor vibrators 1 and 2 are adjustably mounted by means of bolts 7 on a firm base of guides such as U-beams 3 in a frame 4, so that a rigid structure is obtained. The guides 3 are provided with longitudinal slots 8 in which the bolts 7 are slidable for adjustment purposes; see Fig. 3. At its four corners, the frame 4 is suspended on springs 5, so that it can freely carry out the oscillations produced in it under the action of the rotor vibrations. These vibrators are placed with their axes mutually parallel. Under these conditions it is found that the rotors, when moving, are automatically induced to rotate synchronously, i. e. so that the eccentrics at the same time pass the highest and lowest point relatively to the plane 4 of the frame, whereby a so-called directed vibrating action is obtained, when they rotate in a direction opposite to each other. This consequently occurs quite independently of the fact that there is not any rotary mechanical clutch between the rotors. The synchronous effect is so powerful that this action occurs, even though the technical data of the rotors do not wholly correspond to each other. If the current to one rotor is interrupted, the latter nevertheless continues to rotate synchronously with the operating rotor, though somewhat phase-displaced (10–20°). This phase-displacement lacks practical importance and cannot be observed, when the unit is mounted on a vibrating table or the like. Through the medium of the rigid, oscillating base there is thus obtained, also in case current is supplied to one rotor only, a synchronous movement of the two rotors and therewith the intended directed vibration of the device.

The device shown in Fig. 2 is an example of the application of the principles described above. The object to be vibrated, e. g. a moulding box 6 with contents, is placed on a table or base 4 corresponding to the frame 4 of Fig. 1. This table rests on springs 5, so that it can oscillate relatively freely in a substantially vertical direction. Beneath the table the rotors 1, 2 are adjustably mounted according to the principles set forth in connection with Fig. 1. When the rotors rotate opposite to each other, the table 4 will carry out substantially vertical vibratory motions, the moulding box or the material contained therein being exposed to substantially vertically acting vibratory impulses.

By applying the same principles it is obviously possible, by suitably placing the rotors and springs, to obtain a vibratory effect directed substantially in some other, e. g. horizontal, plane, as will be readily understood.

I claim:

1. A vibrating device for producing directed vibrations which comprises in combination a rigid base, at least two shafts mounted on said base for independent rotation with their axes substantially parallel, means connected to each of said shafts for causing them to describe an oscillatory motion when rotated, means for driving said shafts independently and in opposite directions and resilient means for supporting said base enabling it to oscillate in synchronism with said shafts, whereby synchronism between the two rotating shafts is automatically secured without any driving connections between said shafts resulting in the desired directed vibrations.

2. A vibrating device for producing directed vibrations which comprises in combination a rigid base, at least two shafts mounted for independent rotation on said base with their axes substantially parallel, a corresponding number of independently mounted electric motors mounted on said base and adapted to rotate said shafts independently and in opposite directions, means connected with said shafts for causing them to describe oscillatory motions when rotated, and resilient means for supporting said base enabling it to oscillate in synchronism with said shafts, whereby synchronism develops automatically between the two independently rotating shafts.

3. The device of claim 2 wherein the shafts and motors are mounted on guides permitting linear adjustment of their relative positions on said base.

4. The device of claim 2 wherein the shafts and motors are mounted substantially symmetrically on said base with adjustable mountings.

RAGNAR ALRIK OLOF SIGNEUL.

REFERENCES CITED

The following references are of record in the file of this patent:

UNITED STATES PATENTS

| Number | Name | Date |
|---|---|---|
| 2,200,724 | Robins | May 14, 1940 |

FOREIGN PATENTS

| Number | Country | Date |
|---|---|---|
| 212,155 | Great Britain | Mar. 13, 1924 |
| 233,826 | Germany | July 28, 1909 |